(12) United States Patent
Feng et al.

(10) Patent No.: US 10,968,110 B2
(45) Date of Patent: Apr. 6, 2021

(54) METHOD FOR PREPARING TITANIUM SILICON MOLECULAR SIEVE

(71) Applicant: China University of Petroleum (East China), Qingdao (CN)

(72) Inventors: Xiang Feng, Qingdao (CN); Dong Lin, Qingdao (CN); Chaohe Yang, Qingdao (CN); Yibin Liu, Qingdao (CN); Xiaobo Chen, Qingdao (CN); Yongxiao Tuo, Qingdao (CN); Xin Jin, Qingdao (CN)

(73) Assignee: CHINA UNIVERSITY OF PETROLEUM (EAST CHINA), Shandong (CN)

( * ) Notice: Subject to any disclaimer, the term of this patent is extended or adjusted under 35 U.S.C. 154(b) by 0 days.

(21) Appl. No.: 16/857,881

(22) Filed: Apr. 24, 2020

(65) Prior Publication Data
US 2020/0339432 A1   Oct. 29, 2020

(30) Foreign Application Priority Data

Apr. 26, 2019   (CN) .......................... 201910341872.7

(51) Int. Cl.
| | | |
|---|---|---|
| *C01B 39/48* | (2006.01) | |
| *B01J 29/89* | (2006.01) | |
| *B01J 37/34* | (2006.01) | |
| *C01B 39/46* | (2006.01) | |

(52) U.S. Cl.
CPC ............... *C01B 39/48* (2013.01); *B01J 29/89* (2013.01); *B01J 37/345* (2013.01); *C01B 39/46* (2013.01)

(58) Field of Classification Search
CPC .......... C01B 39/46; C01B 39/48; B01J 29/89; B01J 37/345

USPC ......................................................... 423/700
See application file for complete search history.

(56) References Cited

U.S. PATENT DOCUMENTS

| | | | | |
|---|---|---|---|---|
| 2003/0152510 A1* | 8/2003 | Senderov | .............. | C07C 45/294 423/713 |
| 2004/0179996 A1* | 9/2004 | Shan | ....................... | C01B 37/00 423/630 |
| 2015/0118149 A1* | 4/2015 | Xia | ......................... | C01B 39/00 423/703 |

FOREIGN PATENT DOCUMENTS

| | | | |
|---|---|---|---|
| CN | 107188194 A | * | 9/2017 |
| CN | 109437228 A | * | 3/2019 |

* cited by examiner

*Primary Examiner* — David M Brunsman
(74) *Attorney, Agent, or Firm* — Volpe Koenig

(57) ABSTRACT

A method for preparing titanium-containing molecular sieves include the following steps: irradiating a mixed solution containing a silicon source, a template and a titanium source by a light source containing ultraviolet light before crystallization, and then subjecting the mixed solution to crystallization and post-treatment to obtain the titanium-containing molecular sieve. In the method for preparing titanium-containing molecular sieve of the present invention, the mixed solution containing the silicon source, the template and the titanium source is treated with the ultraviolet light, and free radicals generated by the ultraviolet light can effectively dissociate titanium oligomers and accelerate the hydrolysis of the silicon source, and thus match the hydrolysis rate of a silicon-titanium precursor, thereby preventing a titanium monomer from self-polymerization to form non-framework titanium. Therefore, a titanium-containing molecular sieve that does not contain the non-framework titanium can be quickly prepared.

15 Claims, 4 Drawing Sheets

METHOD FOR PREPARING TITANIUM SILICON MOLECULAR SIEVE

CROSS REFERENCE TO RELATED APPLICATIONS

This application claims priority to Chinese Application No. 201910341872.7, filed on Apr. 26, 2019, entitled "METHOD FOR PREPARING titanium-containing molecular sieve", which is specifically and entirely incorporated by reference.

FIELD OF THE INVENTION

The present invention belongs to the field of catalysts, relates to a method for preparing a titanium-containing molecular sieve, and in particular relates to a green preparation method for light-controlled rapid synthesis of a titanium-containing molecular sieve not containing non-framework titanium.

BACKGROUND OF THE INVENTION

In the 21st century, with the rapid development of science and technology, people's living standards and culture levels have been gradually improved, and the improvement of environmental protection requirements is also urgent. The contradiction between people's ever-increasing living standards and severe environmental conditions has been gradually formed, so environmental protection has been put on the agenda. At present, in order to adapt to the concept of green environmental protection, slogans such as "atomic economy" and zero emission of industrial pollution are proposed. At the same time, at least 90% of the processes in the contemporary chemical industry are completed with the participation of catalysts. Therefore, green and environmentally-friendly catalysts have gradually occupied the market. Among them, a titanium-containing molecular sieve is gradually gaining favor from the market due to its characteristics of non-pollution to the environment and excellent oxidation performance.

The titanium-containing molecular sieve was first reported and successfully synthesized by Taramass from Italy in 1983. Thereafter, the titanium-containing molecular sieve has been widely concerned. Since the titanium-containing molecular sieve has excellent oxidation activity after titanium atoms are inserted into the skeleton of pure silicon of the molecular sieve, the titanium-containing molecular sieve is also widely used in various oxidation reactions such as ammoxidation of ketones, hydroxylation of aromatic hydrocarbons, epoxidation of olefins, oxidative desulfurization and partial oxidation of alkanes. In the use of the titanium-containing molecular sieve, hydrogen peroxide is usually used as an oxidizing agent. This oxidizing agent is green and environmentally friendly, non-toxic and harmless, and conforms to the current trend of environmental protection. Furthermore, the reaction temperature is usually at room temperature, and the reaction conditions are mild and not harsh, which is in line with the cutting-edge concept of zero emission of industrial pollution.

Up to now, a large number of titanium-containing molecular sieves have been synthesized, including TS-1, TS-2, Ti-Beta, Ti-MCM-41, Ti-MCM-48, Ti-TUD, etc. Among them, a very critical step in the synthesis process of the titanium-containing molecular sieves is to avoid the generation of non-framework titanium, because the non-framework titanium will cause a series of side reactions, and thus result in a decrease in selectivity, activity and the like of the reaction, which greatly affects the reaction effect. Therefore, in order to avoid the generation of the non-framework titanium, a series of measures emerge at the right moment, including adding a surfactant, slowing down the dropwise adding rate of the titanium source, using a solvent for dissolution, and inhibiting the hydrolysis of the titanium source, etc. However, for these methods, on one hand, the use of surfactants and solvents will greatly pollute the environment; and on the other hand, the too slow dropwise adding rate of the titanium source will affect the efficiency of the entire manufacturing process, greatly increasing the time cost in the industrial synthesis. Therefore, an entirely new synthesis method is urgently needed to overcome the problem of environmental pollution and improve the synthesis efficiency, but at the same time still ensure that the molecular sieve does not contain the non-framework titanium.

SUMMARY OF THE INVENTION

An objective of the present invention is to provide a method for preparing a titanium-containing molecular sieve. By adopting this preparation method, titanium-containing molecular sieves (for example: TS-1, TS-2) not containing non-framework titanium can be prepared without addition of a surfactant or a solvent other than $H_2O$.

Another objective of the present invention is to provide a method for preparing a titanium-containing molecular sieve. By using this method, the manufacturing efficiency of the molecular sieve can be significantly improved, the time required for synthesis is reduced, and the synthesis steps are simple.

In order to achieve the aforementioned objective, the following technical solutions are adopted.

In an aspect, a method for preparing a titanium-containing molecular sieve includes the following steps: irradiating a mixed solution containing a silicon source, a template and a titanium source by a light source containing ultraviolet light before crystallization, and then subjecting the mixed solution to crystallization and post-treatment to obtain the titanium-containing molecular sieve.

The method for preparing the titanium-containing molecular sieve of the present invention, includes treating the mixed solution containing the silicon source, the template and the titanium source with ultraviolet light. In the traditional synthesis of titanium-containing molecular sieves, it is necessary to slowly add a titanium source dropwise or add a solvent to inhibit the hydrolysis of the titanium source, while the present invention adopts a new method, in which the titanium source, the silicon source, the template and water can be quickly mixed to hydrolyze the titanium source into titanium oligomers, and then the free radicals generated by the ultraviolet light effectively dissociate the titanium oligomers and accelerate the hydrolysis of the silicon source, thereby matching the hydrolysis rate of the silicon-titanium precursor, and effectively preventing the non-framework titanium. Therefore, a titanium-containing molecular sieve that does not contain the non-framework titanium can be quickly prepared.

DETAILED DESCRIPTION OF THE EMBODIMENTS

Figure 1:
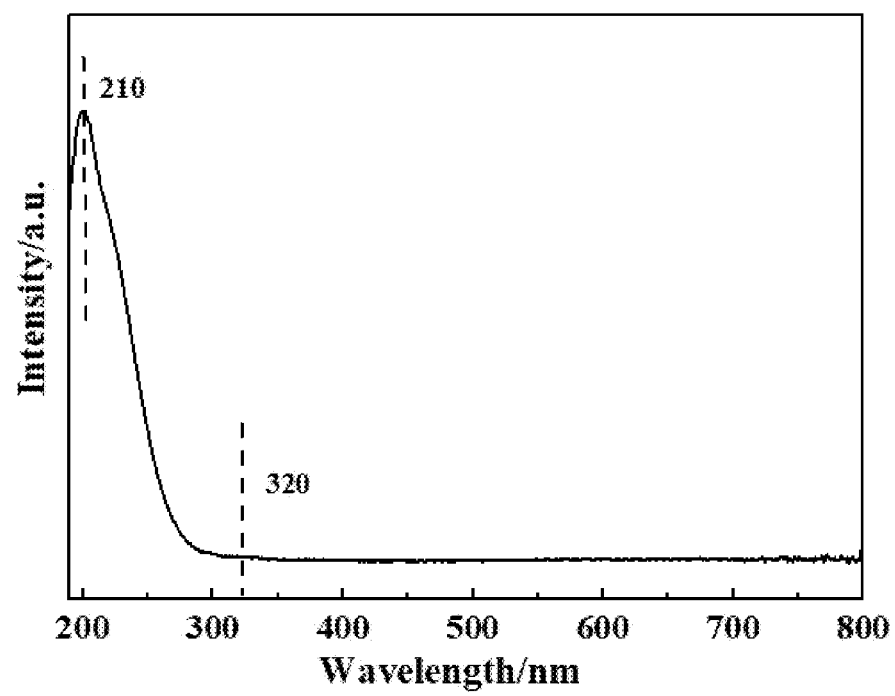
FIG. 1 is an UV-Vis pattern of a molecular sieve of Example 1.

The method for preparing a titanium-containing molecular sieve of the present invention is described in further detail below. The claimed scope of the application is not limited, and the claimed scope is defined by the claims. Certain disclosed specific details provide a comprehensive understanding of each disclosed embodiment. However, those skilled in the relevant art know that, the embodiment can also be implemented using other materials and the like, without using one or more of these specific details.

Unless the context otherwise requires, in the specification and claims, the terms "including" and "comprising" are to be understood as open-ended and inclusive, i.e., meaning "including but not limited to."

"An embodiment", "one embodiment", "another embodiment" or "certain embodiments" mentioned in the specification refers to that the specifically referred features, structures or characteristics as described related to the embodiments are included in at least one embodiment. Therefore, "an embodiment", "one embodiment", "another embodiment", or "certain embodiments" are not necessarily all referring to the same embodiment. Moreover, specific features, structures, or characteristics may be combined in any manner in one or more embodiments. Each feature disclosed in the specification may be replaced by any alternative feature that can provide the same, equivalent or similar purpose. Therefore, unless otherwise specified, the disclosed features are only general examples of equivalent or similar features.

Definition of ultraviolet light: the ultraviolet light is the general term for radiation with a wavelength ($\lambda$) of 10-400 nm in electromagnetic spectrum.

Definition of infrared light: the infrared light is a general term for radiation with a wavelength ($\lambda$) of 700 nm<$\lambda$≤1 mm in the electromagnetic spectrum.

Definition of visible light: the visible light is a general term for radiation with a wavelength ($\lambda$) of 400 nm<$\lambda$≤700 nm in the electromagnetic spectrum.

Definition of the term "silicon source": the silicon source in this application is selected from a water-soluble silicon-containing compound or a silicon-containing compound that can be dissolved in water, and usually refers to a silica source ($SiO_2$).

Definition of the term "titanium source": the titanium source in the present application is selected from a water-soluble titanium-containing compound or a titanium-containing compound that can be dissolved in water. The titanium source usually refers to a titanium dioxide source ($TiO_2$).

An organic template includes but is not limited to one or more of ethylenediamine, piperidine, tetraethylammonium hydroxide, n-butylamine, tetrapropylammonium hydroxide, tetrabutylammonium hydroxide, tetrapropylammonium bromide and tetrabutylammonium bromide.

The silicon source includes but is not limited to tetraethyl orthosilicate and/or silica sol.

The titanium source includes, but is not limited to one or more of tetrabutyl titanate, tetraethyl titanate, tetraisopropyl titanate, titanium trichloride, hexafluorotitanic acid, and titanium tetrachloride.

The light used in the present invention includes the ultraviolet light; a mixed light source of the ultraviolet light and the infrared light; a mixed light source of the ultraviolet light and the visible light; or a mixed light source of the ultraviolet light, the infrared light and the visible light.

In an aspect, a method for preparing a titanium-containing molecular sieve includes the following steps:

(1) a template, a silicon source, a titanium source and water are mixed to obtain a mixed solution I;

(2) the mixed solution I of step (1) is irradiated with a light source containing ultraviolet light to obtain a mixed solution II;

(3) the mixed solution II is subjected to crystallization, solid-liquid separation, and drying to obtain a titanium-containing molecular sieve A.

The titanium-containing molecular sieve A is a molecular sieve with blocked micropores.

In another aspect, a method for preparing a titanium-containing molecular sieve includes the following steps:

(1) a template, a silicon source, a titanium source and water are mixed to obtain a mixed solution I;

(2) the mixed solution I of step (1) is irradiated with a light source containing ultraviolet light to obtain a mixed solution II;

(3) the mixed solution II is subjected to crystallization, solid-liquid separation, drying, and calcination to obtain a titanium-containing molecular sieve B.

The titanium-containing molecular sieve B is a molecular sieve without blocked micropores.

After the mixed solution I is irradiated with the ultraviolet light source, free radicals are generated in the resultant mixed solution II, and the free radicals will attack the titanium oligomers, thereby promoting the hydrolysis of the titanium oligomers, and the presence of the free radicals will also accelerate the hydrolysis of the silicon source, thereby matching the hydrolysis rate of the silicon-titanium precursor and thus avoiding the generation of the non-framework titanium.

In certain embodiments, as in the step (2), the time for irradiating by the light source containing the ultraviolet light is longer than the shortest time required for the ultraviolet light to decompose the titanium oligomers, and is shorter than the time for self-polymerization of a titanium monomer. Preferably, the time for irradiating by the light source containing the ultraviolet light is 0.1-24 h; more preferably, the time for irradiating by the light source containing the ultraviolet light is 0.5-15 h; and still more preferably, the time for irradiating by the light source containing the ultraviolet light is 1-3 h.

In certain embodiments, as in the step (2), the light source may be an ultraviolet light source with a wavelength which is any wavelength of 10-400 nm; or the light source is an ultraviolet light source with a wavelength which is a mixed wavelength of 10-400 nm; or the light source is a mixture of ultraviolet light with a wavelength which is any wavelength or a mixed wavelength of 10-400 nm and infrared light with any wavelength or a mixed wavelength; or the light source is a mixture of ultraviolet light with a wavelength which is any wavelength or a mixed wavelength of 10-400 nm and visible light with any wavelength or a mixed wavelength; or the light source is a mixed light source which is a mixture of ultraviolet light with a wavelength which is any wavelength or a mixed wavelength of 10-400 nm, infrared light with any wavelength or a mixed wavelength, and visible light with any wavelength or a mixed wavelength.

Among them, the wavelength of the infrared light is: 700 nm<$\lambda$≤1 mm; and the wavelength of the visible light is: 400 nm<$\lambda$≤700 nm.

Preferably, the light source is mixed ultraviolet light with a wavelength of 10-400 nm.

More preferably, the light source is mixed long-wave ultraviolet light with a wavelength of 320-400 nm.

After extensive and in-depth research, the inventor in this application has discovered a green synthesis method for rapidly preparing a titanium-containing molecular sieve not containing the non-framework titanium. That is, the principle that the free radicals generated by the ultraviolet light can effectively dissociate the titanium oligomers is used for preparing the titanium-containing molecular sieve catalyst environmentally and efficiently.

In the process of preparing the titanium-containing molecular sieve of the present invention, there is no need to add Tween-20, isopropanol and the like alcohols, and accordingly the subsequent step of removing the alcohols is omitted; and at the same time, the disadvantages that the titanium source needs to be slowly added and the hydrolysis of the silicon source is slow are overcome. Therefore, the method for preparing the titanium-containing molecular sieve of the present application takes much less time than the traditional preparation of the molecular sieve, and has environmentally friendly and simple synthesis steps.

In some embodiments, in the step (1), the template, the silicon source, the titanium source, and water are mixed under stirring conditions, and the stirring time is shorter than the time for generating a large amount of non-framework titanium and ensures sufficient mixing of the solution. Preferably, the stirring time is 0.01-10 h; and more preferably, the stirring time is 0.1-0.5 h.

In the process of mixing the template, the silicon source, the titanium source and water, due to the faster hydrolysis rate of titanium, the stirring time being too short is not conducive to the sufficient mixing of the solution, and the stirring time being too long will generate a large amount of the non-framework titanium.

In some embodiments, in the step (1), during the process of mixing the template, the silicon source, the titanium source and water, the temperature is higher than 0° C. and lower than 100° C.; and more preferably, the temperature for mixing is higher than 10° C. and lower than 35° C.

In the step (2), the temperature of the mixed solution I irradiated by the light source is controlled to be higher than 0° C. and lower than 100° C.; and preferably, higher than 10° C. and lower than 35° C.

In this application, the matter quantity ratio of the silicon source to the titanium source is: Si/Ti=(40-1000):1. The matter quantity ratio of the template to the silicon source is: Si/template=(0.1-50):1.

In some embodiments, in the step (3), the crystallization temperature is higher than 100° C. and lower than 200° C. More preferably, the crystallization temperature is higher than 140° C. and lower than 180° C. Here the crystallization temperature is higher than the growth temperature of the molecular sieve and lower than the withstand temperature of the molecular sieve framework.

In some embodiments, the crystallization time is longer than 5 h, and the preferred crystallization time is 72 h of crystallization.

In some embodiments, in the step (3), the crystallization includes static crystallization and/or spin crystallization; and preferably, the crystallization is spin crystallization.

In some embodiments, in the step (3), the mixed solution II is cooled after the crystallization. The cooling method includes water cooling or natural cooling; and preferably, the cooling method is water cooling.

In some embodiments, in the step (3), the drying temperature is lower than the decomposition temperature of the organic template; preferably, the drying temperature is 40-120° C.; and more preferably, the drying temperature should be 70-90° C.

In some embodiments, in the step (3), the calcination temperature is higher than the decomposition temperature of the template and lower than the withstand temperature of the molecular sieve framework.

Preferably, during the calcination process, the heating rate is lower than the tolerable heating rate of the molecular sieve framework, and the calcination time is shorter than the tolerable calcination time of the molecular sieve framework; and preferably, the heating rate is 1-10° C./min, the calcination temperature is 500-700° C., and the calcination time is 4-8 h. More preferably, the heating rate is 4-6° C./min, the calcination temperature is 550-600° C., and the calcination time is 5-7 h.

In the present invention, the solid-liquid separation of the step (3) adopts centrifugal separation, and the centrifugal separation uses the equipment and process conditions commonly used in the preparation of catalysts in the prior art.

The molecular sieve prepared by the present invention can be used as a carrier to prepare a catalyst. For example, the titanium-containing molecular sieve can be used as a carrier to support metal element nanoparticles. The metal element includes the gold element.

The preparation method of the catalyst may include mixing the titanium-containing molecular sieve prepared by the present invention with a metal element-containing solution, aging under the condition of pH 6-8, and then centrifuging and drying to obtain a metal-loaded titanium-containing molecular sieve catalyst, wherein the aging time of the solution is 6 hours; the speed of the centrifugal separation is 10,000 rpm; the catalyst is subjected to vacuum drying at room temperature for 24 hours to obtain a supported catalyst for propene epoxidation.

Preferably, the metal element-containing solution includes chloroauric acid and gold acetate solutions.

Compared with the prior art, the advantages of this application are as follows.

For the prior art, the production of the non-framework titanium can be suppressed jointly by adding a surfactant, a solvent, and slowly adding the titanium source. However, the addition of the surfactant and the solvent will cause huge environmental problems during the industrialization process, which is not conducive to the implementation of the concept of green environmental protection, thereby inhibiting the industrialization of the titanium-containing molecular sieve. Moreover, the slow addition of the titanium source will reduce the production efficiency of the titanium-containing molecular sieve. At the same time, in the process of using isopropanol to suppress generation of the non-framework titanium, the addition of isopropanol causes the need of removing alcohols in a later stage to ensure the normal crystallization of the titanium-containing molecular sieve, which will greatly extend the synthesis time and increase energy consumption.

In the preparation method of the titanium-containing molecular sieve of the present application, in the case of ensuring that the non-framework titanium is not produced, not only the use of the surfactant and the solvent can be eliminated, but also the production efficiency of the molecular sieve can be significantly improved, so as to reduce the time required for synthesis. Thus, the rapid and green preparation of a molecular sieve not containing the non-framework titanium is realized.

The present invention will be described in detail below in conjunction with specific examples. It should be understood that, the following examples are only intended to illustrate the present invention, rather than limiting the scope of the present invention. The experimental methods in the following examples which are not specified with specific conditions are generally carried out according to conventional conditions or according to the conditions recommended by the manufacturer. Unless otherwise stated, all percentages, ratios, proportions, or fractions are calculated by weight.

The unit of weight volume percentage in the present invention is well known to those skilled in the art. For example, it refers to the weight of a solute in 100 ml of a solution.

Unless otherwise defined, all terms used herein have the same meaning as those familiar to those skilled in the art. Furthermore, any method and material similar or equivalent to those recited can be applied to the method of the present invention. The preferred implementation methods and materials described herein are for demonstration purposes only.

The present invention will be further described with reference to the specific accompanying drawings and specific examples.

Example 1

15 g of tetrapropylammonium hydroxide (25 wt %) is taken, added with 5 g of water, 0.8052 g of tetrabutyl titanate, 40 g of tetraethyl orthosilicate, and stirred at 30° C. for half an hour for mixing, so as to obtain a mixed solution. Then under the irradiation condition of mixed ultraviolet light of 10-400 nm with the radiation intensity of 30 W/m2, the mixed solution with a temperature of about 30° C. is irradiated for 4 hours, and the solution became clear. Then, the light-irradiated solution is put into a crystallization autoclave for 72 hours of crystallization (the crystallization temperature is 170° C.), then taken out, naturally cooled, centrifuged, dried at 80° C., and calcined at 550° C. for 8 hours. Thus, a titanium-containing molecular sieve TS-1 almost not containing the non-framework titanium is obtained.

Figure 2:
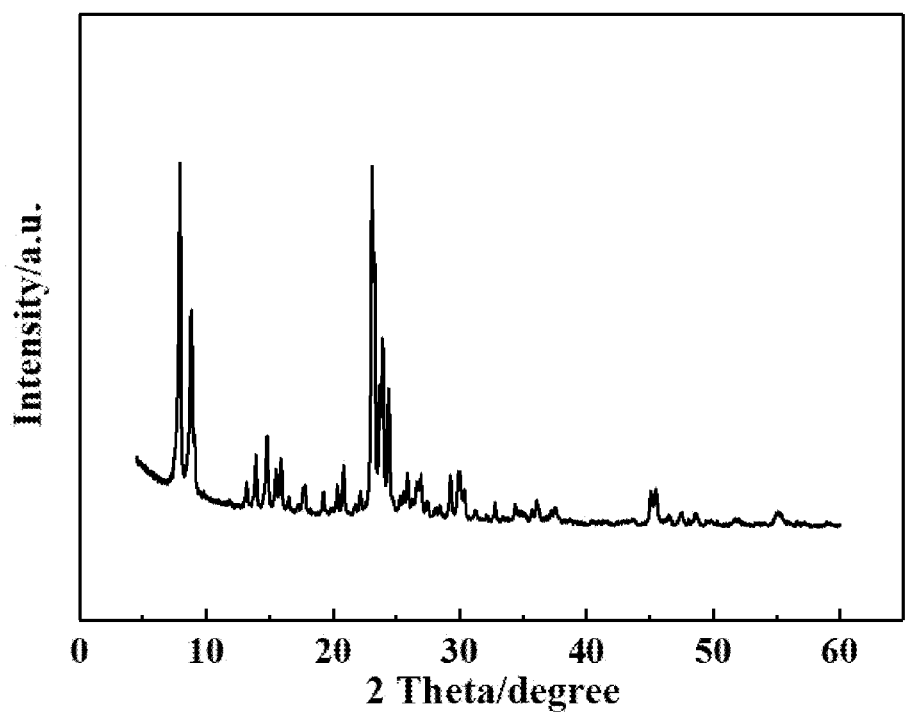
FIG. 2 is an XRD pattern of the molecular sieve of Example 1.
Figure 3:
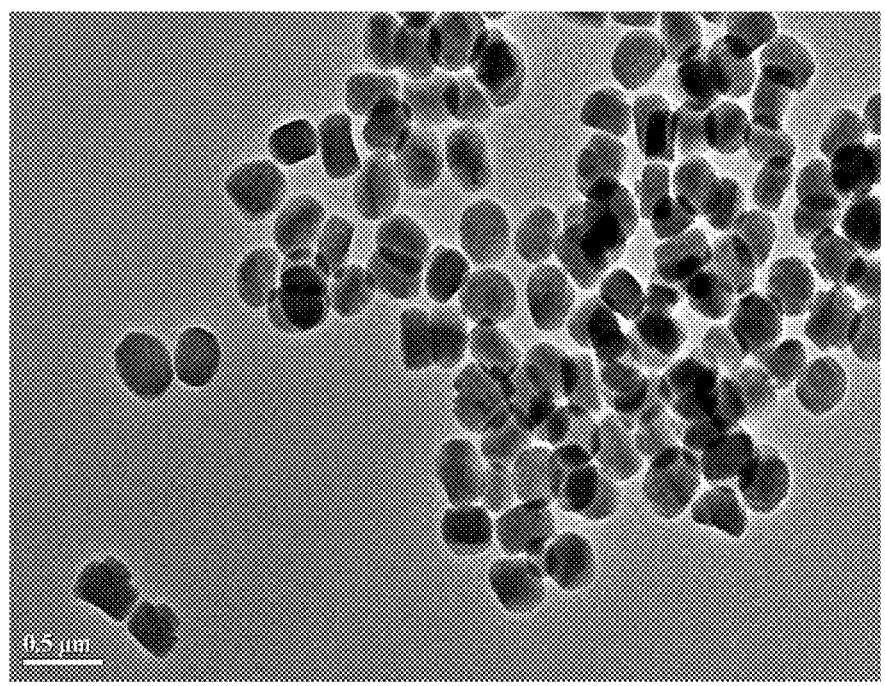
FIG. 3 is a TEM pattern of the molecular sieve of Example 1.

The titanium-containing molecular sieve obtained in this example is subjected to ultraviolet-visible (UV-vis) detection. Referring to FIG. 1, the detection result shows that in the ultraviolet spectrum of the molecular sieve, a peak of tetra-coordinate framework titanium occurs at 210 nm, and no peak of the non-framework titanium occurs at 320 nm, indicating that the synthesized molecular sieve almost does not contain the non-framework titanium. FIG. 2 shows the XRD pattern of the sample. The result of the pattern indicates that the TS-1 molecular sieve is successfully synthesized and has a typical MFI structure. The TEM result (as shown in FIG. 3) shows that, the size of the synthesized titanium-containing molecular sieve is about 220 nm, which is a nanoscale molecular sieve.

0.1 g of chloroauric acid is dissolved into 20 g of water, then 0.5 g of the titanium-containing molecular sieve TS-1 prepared above is added and stirred for half an hour. A cesium carbonate solution is added to adjust the pH to 7.3, and the pH is kept under a condition of vigorous stirring for 6 h. Subsequently, the catalyst Au/TS-1 could be obtained by centrifugation, filtration, and then vacuum drying at room temperature.

Examples 2-9

According to the conditions listed in Table 1 and Table 2, titanium-containing molecular sieves and catalysts are prepared according to the same method as in Example 1. The obtained titanium-containing molecular sieves are subjected to UV-vis detection. It is found that in the ultraviolet spectrum of the molecular sieves, a peak of tetra-coordinate framework titanium occurs at 210 nm, and no peak of the non-framework titanium occurs at 320 nm, indicating that the synthesized molecular sieves do not contain the non-framework titanium.

Figure 4:
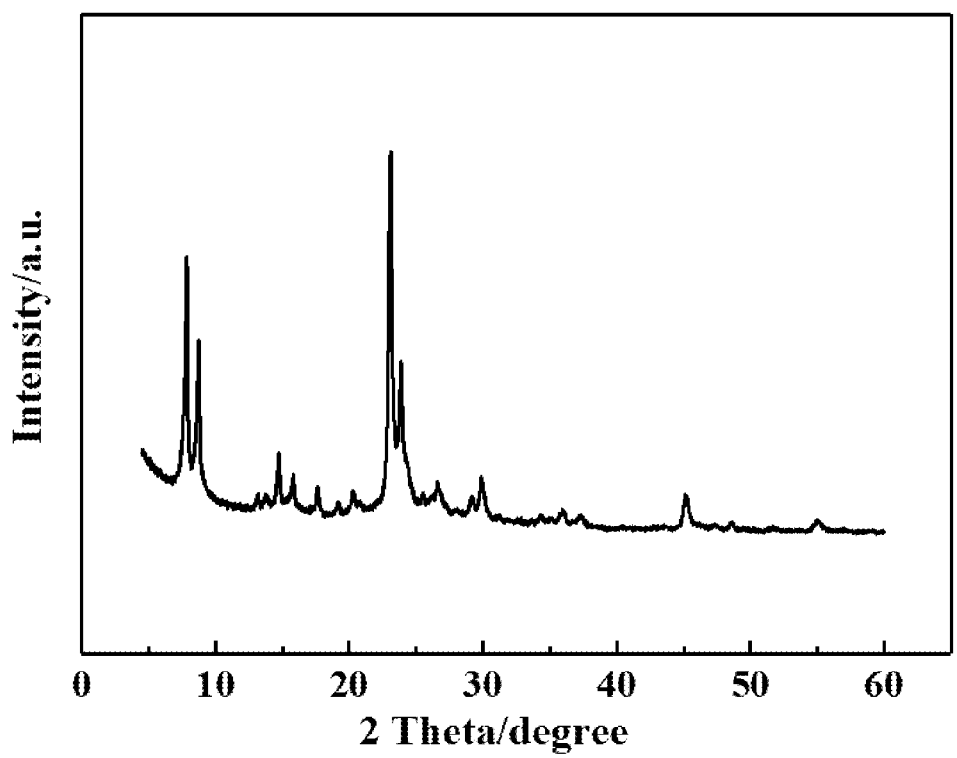
FIG. 4 is an XRD pattern of a molecular sieve of Example 5.
Figure 5:
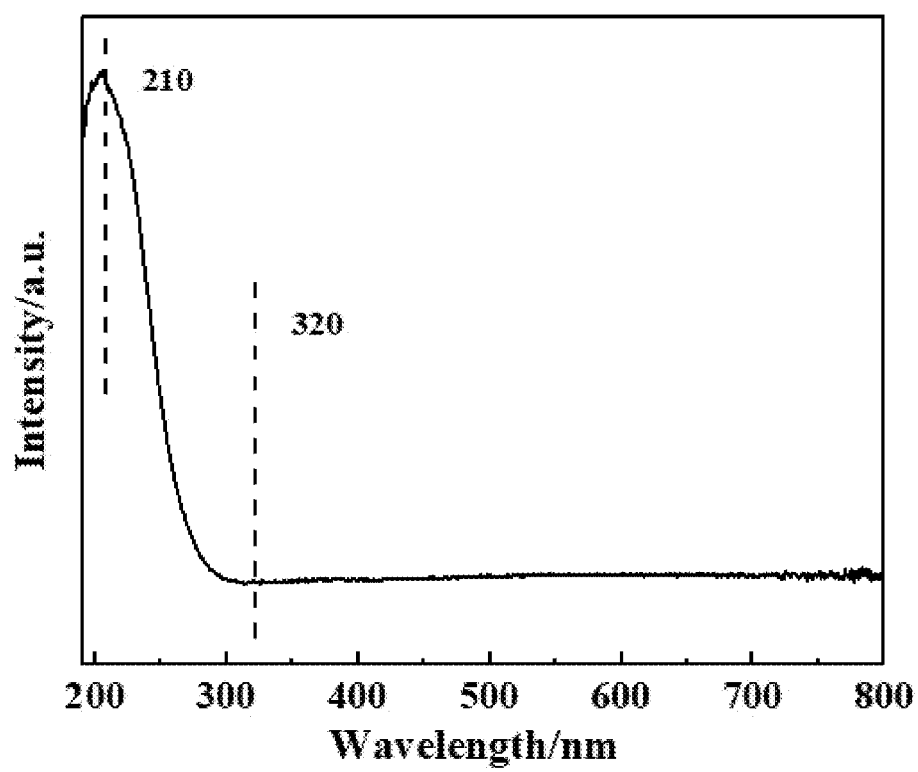
FIG. 5 is an UV-Vis pattern of the molecular sieve of Example 5.
Figure 6:
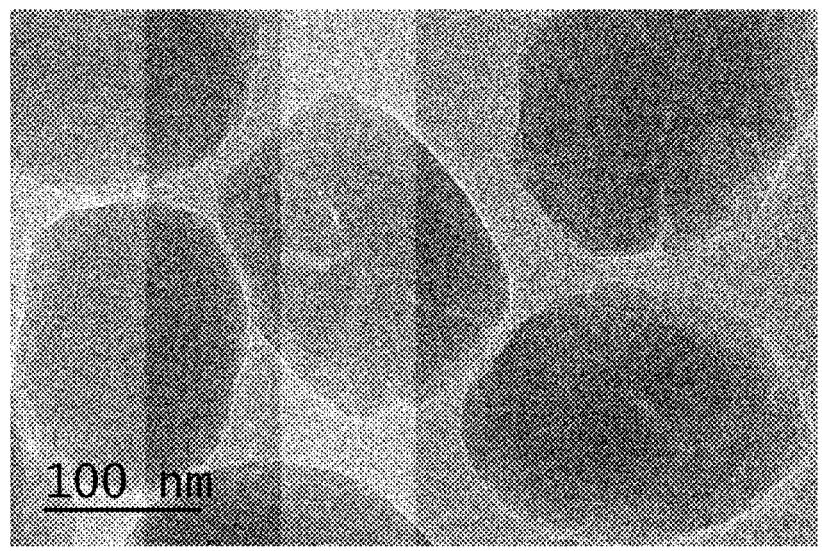
FIG. 6 is a TEM pattern of the molecular sieve of Example 5.

FIGS. 4-6 show the measurement results of the titanium-containing molecular sieve prepared in Example 5. The detection result shows that in the UV-vis spectrum of the molecular sieve, a peak of tetra-coordinate framework titanium occurs at 210 nm, and no peak of the non-framework titanium occurs at 320 nm, indicating that the synthesized molecular sieve does not contain the non-framework titanium. The XRD pattern shows a typical MEL structure, which is a TS-2 titanium-containing molecular sieve. The TEM image shows that the size of the molecular sieve is about 100-200 nm.

TABLE 1

|  | Example 2 | Example 3 | Example 4 | Example 5 |
| --- | --- | --- | --- | --- |
| Template | 20 g TPAOH* (25 wt %) | 15 g TPAOH* (25 wt %) | 15 g TPAOH* (25 wt %) | 17 g TBAOH** (25 wt %) |
| Titanium Source | 1.0 g tetrabutyl titanate | 0.5398 g tetraethyl titanate | 0.6725 g tetraisopropyl titanate | 0.8052 g tetrabutyl titanate |
| Silicon Source | 120 g silica sol (25 wt %) | 100 g silica sol (25 wt %) | 80 g silica sol (25 wt %) | 60 g tetraethyl orthosilicate |
| Water | 5 g | 5 g | 5 g | 5 g |
| Stirring conditions | 30° C., 0.5 hour | 20° C., 0.5 hour | 60° C., 0.5 hour | 30° C., 0.5 hour |

TABLE 1-continued

|  | Example 2 | Example 3 | Example 4 | Example 5 |
|---|---|---|---|---|
| Radiation conditions | mixed ultraviolet light of 320-400 nm, 30 W/m$^2$, 30° C., 4.5 hours | mixed ultraviolet light of 10-320 nm, 30 W/m$^2$, 20° C., 45 hours | mixed ultraviolet light of 10-400 nm, mixed infrared light of 770 nm < $\lambda \leq$ 1 mm and mixed visible light of 400 nm < $\lambda \leq$ 770 nm, 20 W/m$^2$, 60° C., 6 hours | mixed ultraviolet light of 10-400 nm and mixed infrared light of 770 nm < $\lambda \leq$ 1 mm, 35 W/m$^2$, 30° C., 4 hours |
| Crystallization | 140° C., 50 hours | 170° C., 30 hours | 140° C., 36 hours | 160° C., 50 hours |
| Drying | 80° C. | 80° C. | 80° C. | 40° C. |
| Calcination | 550° C., 8 hours | 600° C., 6 hours | 550° C., 8 hours | 500° C., 7 hours |

TABLE 2

|  | Example 6 | Example 7 | Example 8 | Example 9 |
|---|---|---|---|---|
| Template | 17 g TBAOH** (25 wt %) | 30 g TBAOH** (25 wt %) | 17 g TBAOH** (25 wt %) | 20 g TBAOH** (25 wt %) |
| Titanium Source | 0.8052 g tetrabutyl titanate | 0.5398 g tetraethyl titanate | 0.6725 g tetraisopropyl titanate | 1.0 g tetrabutyl titanate |
| Silicon Source | 167 g silica sol (25 wt %) | 150 g silica sol (25 wt %) | 100 g silica sol (25 wt %) | 120 g silica sol (25 wt %) |
| Water | 5 g | 10 g | 15 g | 5 g |
| Stirring conditions | 30° C., 0.5 hour | 30° C., 0.5 hour | 30° C., 0.5 hour | 30° C., 0.5 hour |
| Radiation conditions | mixed ultraviolet light of 10-400 nm, 40 W/m$^2$, 30° C., 4 hours | mixed ultraviolet light of 10-400 nm and mixed infrared light of 770 nm < $\lambda \leq$ 1 mm, 30 W/m$^2$, 30° C., 4 hours | mixed ultraviolet light of 10-400 nm, mixed infrared light of 770 nm < $\lambda \leq$ 1 mm and mixed visible light of 400 nm to 770 nm, 15 W/m$^2$, 30° C., 12 hours | ultraviolet light of 10-400 nm, 5 W/m$^2$, 30° C., 24 hours |
| Crystallization | 120° C., 60 hours | 180° C., 65 hours | 140° C., 50 hours | 140° C., 50 hours |
| Drying | 80° C. | 80° C. | 80° C. | 80° C. |
| Calcination | 550° C., 8 hours | 550° C., 8 hours | 550° C., 8 hours | 550° C., 8 hours |

*TPAOH refers to tetrapropylammonium hydroxide
**TBAOH refers to tetrabutylammonium hydroxide Comparative Example 1

Figure 7:
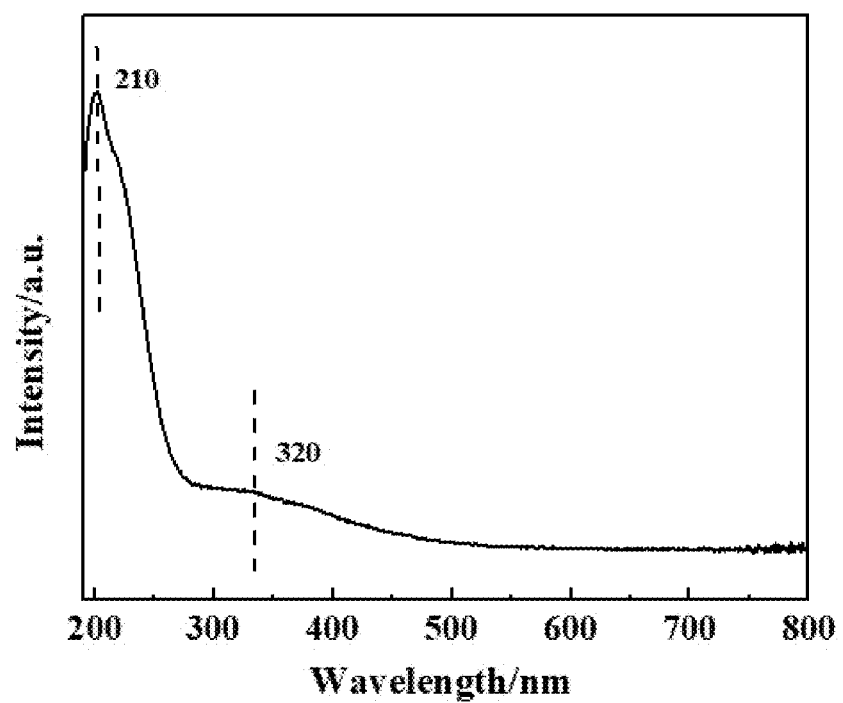
FIG. 7 is an UV-Vis pattern of a molecular sieve of Comparative Example 1.

15 g of tetrapropylammonium hydroxide (25 wt %), 5 g of water, 0.8052 g of tetrabutyl titanate and 40 g of tetraethyl orthosilicate are mixed and stirred at 30° C. for half an hour, and then placed under the condition without ultraviolet radiation for about 4 hours. Then, the solution is put into a crystallization autoclave for 72 hours of crystallization (the crystallization temperature is 170° C.), then taken out, naturally cooled, centrifuged, dried at 80° C., and calcined at 550° C. for 8 hours. Thus, a titanium-containing molecular sieve could be obtained. Then, the obtained titanium-containing molecular sieve is subjected to UV-vis detection, and the detection result is shown in FIG. 7. It is found that in the UV-vis spectrum of the molecular sieve, a peak of tetra-coordinate framework titanium occurs at 210 nm, and a strong peak of the non-framework titanium occurs at 320 nm, indicating that the synthesized molecular sieve contains a large amount of the non-framework titanium.

0.1 g of chloroauric acid is dissolved in 20 g of water, then 0.5 g of TS-1 is added and stirred for half an hour. A cesium carbonate solution is added to adjust the pH to 7.3, and the pH is kept under a condition of vigorous stirring for 6 h. Subsequently, the Au/TS-1 could be obtained by centrifugation, filtration, and then vacuum drying at room temperature.

Comparative Examples 2-8

According to the conditions listed in Table 3 and Table 4, titanium-containing molecular sieves and catalysts are prepared according to the same method as in Comparative Example 1. The titanium-containing molecular sieves are subjected to UV-vis detection. It is found that in the ultraviolet spectrum of the molecular sieves, a peak of tetra-coordinate framework titanium occurs at 210 nm, and a peak of the non-framework titanium occurs at 320 nm, indicating that the synthesized molecular sieve contains a large amount of the non-framework titanium.

TABLE 3

|  | Comparative Example 2 | Comparative Example 3 | Comparative Example 4 | Comparative Example 5 |
|---|---|---|---|---|
| template | 15 g TPAOH* (25 wt %) | 15 g TPAOH* (25 wt %) | 17 g TBAOH** (25 wt %) | 17 g TBAOH** (25 wt %) |
| Titanium Source | 0.5398 g tetraethyl titanate | 0.6725 g tetraisopropyl titanate | 0.8052 g tetrabutyl titanate | 0.8052 g tetrabutyl titanate |
| Silicon Source | 100 g silica sol (25 wt %) | 80 g silica sol (25 wt %) | 60 g tetraethyl orthosilicate | 167 g silica sol (25 wt %) |
| Water | 5 g | 5 g | 5 g | 5 g |
| Stirring conditions | 20° C., 4.5 hours | 60° C., 6.5 hours | 30° C., 4.5 hours | 30° C., 12.5 hours |
| Crystallization | 170° C., 30 hours | 140° C., 36 hours | 160° C., 50 hours | 120° C., 60 hours |
| Drying | 80° C. | 80° C. | 40° C. | 80° C. |
| Calcination | 600° C., 6 hours | 550° C., 8 hours | 500° C., 7 hours | 550° C., 8 hours |

TABLE 4

|  | Comparative Example 6 | Comparative Example 7 | Comparative Example 8 |
|---|---|---|---|
| template | 30 g TBAOH** (25 wt %) | 17 g TBAOH** (25 wt %) | 20 g tetrapropylammonium bromide (25 wt %) 30 g ethylenediamine |
| Titanium Source | 0.5398 g tetraethyl titanate | 0.6725 g tetraisopropyl titanate | 0.8052 g tetrabutyl titanate |
| Silicon Source | 150 g silica sol (25 wt %) | 100 g silica sol (25 wt %) | 40 g tetraethyl orthosilicate |
| Water | 10 g | 15 g | 5 g |
| Stirring conditions | 30° C., 4.5 hours | 30° C., 4.5 hours | 30° C., 4.5 hours |
| Crystallization | 180° C., 65 hours | 140° C., 50 hours | 170° C., 72 hours |
| Drying | 80° C. | 80° C. | 80° C. |
| Calcination | 550° C., 8 hours | 550° C., 8 hours | 550° C., 8 hours |

*TPAOH refers to tetrapropylammonium hydroxide
**TBAOH refers to tetrabutylammonium hydroxide Experimental Example 1

This experimental example is used for determining the performances of the catalysts synthesized in Examples 1-9 and Comparative Examples 1-8 in epoxidation of gas-phase propylene. The reaction results are shown in Table 5. The reaction conditions include: the epoxidation reaction of propylene is conducted in an atmospheric pressure fixed bed under the presence of the catalyst. The composition of the reaction gas is: hydrogen/propylene/oxygen/nitrogen=1/1/1/7 (volume ratio), the space velocity is 14000 $mlh^{-1}g_{Cat}$, the reaction temperature is 200° C., and the catalyst size is 40-100 mesh. The gas after reaction is analyzed by gas chromatography.

TABLE 5

Results of Examples and Comparative Examples

| Sample | Conversion of propylene (%) | Selectivity for Propylene Oxide (%) |
|---|---|---|
| Example 1 | 10.2 | 98.5 |
| Example 2 | 5.0 | 92.3 |
| Example 3 | 5.3 | 90.2 |
| Example 4 | 6.8 | 95.6 |
| Example 5 | 9.5 | 97.8 |
| Example 6 | 4.5 | 96.2 |
| Example 7 | 4.9 | 90.5 |
| Example 8 | 5.0 | 96.3 |
| Example 9 | 6.2 | 87.3 |
| Comparative Example 1 | 4.3 | 70.5 |
| Comparative Example 2 | 3.8 | 65.8 |
| Comparative Example 3 | 4.1 | 78.6 |
| Comparative Example 4 | 4.0 | 82.5 |
| Comparative Example 5 | 3.5 | 78.6 |
| Comparative Example 6 | 3.8 | 79.6 |
| Comparative Example 7 | 4.1 | 78.9 |
| Comparative Example 8 | 3.6 | 68.9 |

The aforementioned are only preferred embodiments of the present invention, and are not intended to limit the scope of the essential technical content of the present invention. The essential technical content of the present invention is broadly defined in the claim scope of the application, and if any technical entity or method completed by any other people, is exactly the same as that defined in the claim scope of the application or is an equivalent modification thereof, then all of the technical entities or methods shall be deemed to be covered by the claim scope.

The invention claimed is:

1. A method for preparing a titanium-containing molecular sieve, comprising the following steps: irradiating a mixed solution containing a silicon source, a template and a titanium source by a light source containing ultraviolet light before crystallization, and then subjecting the mixed solution to the crystallization and post-treatment to obtain the titanium-containing molecular sieve, wherein the time for irradiating by the light source containing the ultraviolet light is longer than the shortest time required for the ultraviolet light to decompose the titanium source, and is shorter than the time for self-polymerization of a titanium monomer.

2. The method for preparing a titanium-containing molecular sieve according to claim 1, wherein the light source comprises an ultraviolet light source with a wavelength which is any wavelength of 10-400 nm; or
the light source is an ultraviolet light source with a wavelength which is a mixed wavelength of 10-400 nm; or the light source is a mixture of ultraviolet light with a wavelength which is any wavelength or a mixed wavelength of 10-400 nm and infrared light with any wavelength or a mixed wavelength; or the light source is a mixture of ultraviolet light with a wavelength which is any wavelength or a mixed wavelength of 10-400 nm and visible light with any wavelength or a mixed wavelength; or the light source is a mixed light source which is a mixture of ultraviolet light with a wavelength which is any wavelength or a mixed wavelength of 10-400 nm, infrared light with any wavelength or a mixed wavelength, and visible light with any wavelength or a mixed wavelength, wherein the wavelength of the infrared light is greater than 700 nm and less than or equal to 1 mm; and the wavelength of the visible light is greater than 400 nm and less than or equal to 700 nm.

3. The method for preparing a titanium-containing molecular sieve according to claim 2, wherein the radiation intensity of the ultraviolet light is more than 1 W/m$^2$.

4. The method for preparing a titanium-containing molecular sieve according to claim 3, wherein the radiation intensity of the ultraviolet light is 1-100 W/m$^2$.

5. The method for preparing a titanium-containing molecular sieve according to claim 4, wherein the radiation intensity of the ultraviolet light is 15-50 W/m$^2$.

6. The method for preparing a titanium-containing molecular sieve according to claim 1, wherein the time for irradiating by the light source containing the ultraviolet light is 0.1-24 h.

7. The method for preparing a titanium-containing molecular sieve according to claim 6, wherein the time for irradiating by the light source containing the ultraviolet light is 0.5-15 h.

8. The method for preparing a titanium-containing molecular sieve according to claim 7, wherein the time for irradiating by the light source containing the ultraviolet light is 1-3 h.

9. The method for preparing a titanium-containing molecular sieve according to claim 1, wherein the preparation method comprises the following steps:
(1) mixing the template, the silicon source, and the titanium source to obtain a mixed solution I;
(2) irradiating the mixed solution I of step (1) with the light source containing the ultraviolet light to obtain a mixed solution II; and
(3) subjecting the mixed solution II to crystallization, solid-liquid separation, and drying to obtain a titanium-containing molecular sieve A; or subjecting the mixed solution II to crystallization, solid-liquid separation, drying, and calcination to obtain a titanium-containing molecular sieve B.

10. The method for preparing a titanium-containing molecular sieve preparation method according to claim 9, wherein in the step (1), the template, the silicon source, the titanium source and water are mixed under stirring conditions for a stirring time of 0.01-10 h.

11. The method for preparing a titanium-containing molecular sieve according to claim 10, wherein in the step (1) the temperature is controlled at 0° C.$<T\leq$100° C.

12. The method for preparing a titanium-containing molecular sieve according to claim 9, wherein in the step (2), the temperature of the mixed solution I is controlled at 0° C.$<T\leq$100° C.

13. The method for preparing a titanium-containing molecular sieve according to claim 12, wherein in the step (2), the temperature of the mixed solution I is controlled at 10° C.$<T\leq$35° C.

14. The method for preparing a titanium-containing molecular sieve according to claim 9, wherein during the calcination, the heating rate is 1-10° C./min, the calcination temperature is 500-700° C., and the calcination time is 4-8 h.

15. The method for preparing a titanium-containing molecular sieve according to claim 9, wherein the silicon source is tetraethyl orthosilicate and/or silica sol; the titanium source is selected from one or more of tetrabutyl titanate, tetraethyl titanate, tetraisopropyl titanate, titanium trichloride, hexafluorotitanic acid and titanium tetrachloride; and the template is selected from one or more of ethylenediamine, piperidine, tetraethylammonium hydroxide, n-butylamine, tetrapropylammonium hydroxide, tetrabutylammonium hydroxide, tetrapropylammonium bromide and tetrabutylammonium bromide.

* * * * *